Jan. 6, 1925.  1,521,857
G. J. BLUM
METHOD OF MAKING CUTTING BLADES
Filed Dec. 8, 1921
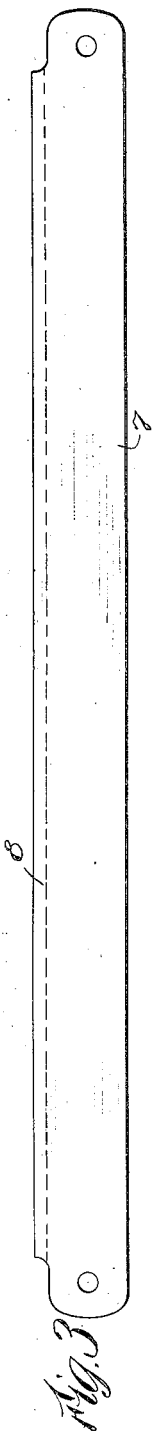
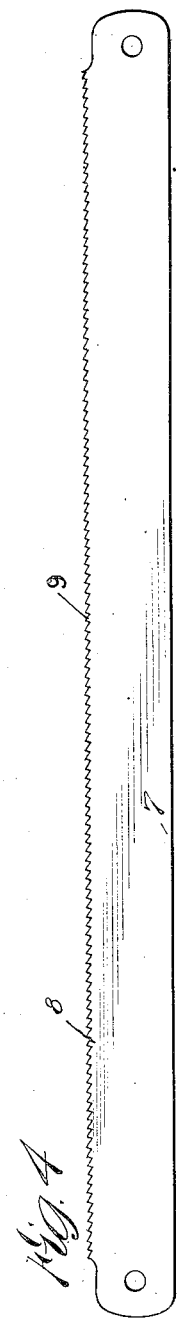
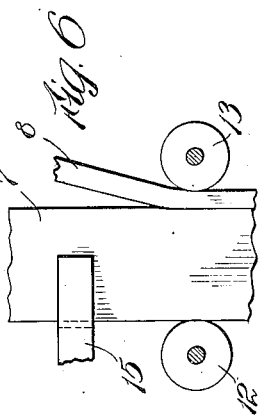
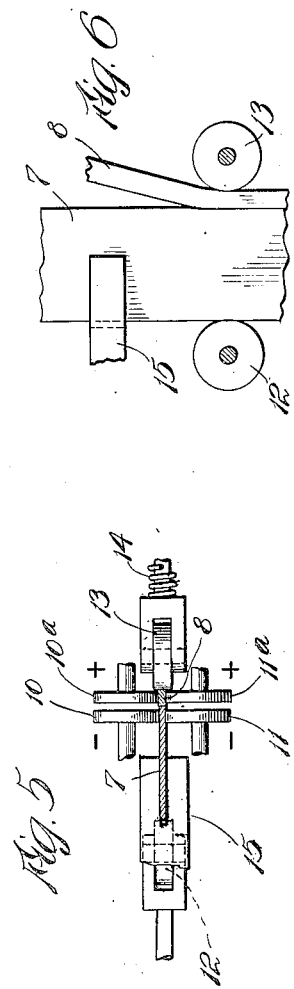
Inventor
George J. Blum
By Miller Chindahl Parker
Attys Patented Jan. 6, 1925.

1,521,857

UNITED STATES PATENT OFFICE.

GEORGE J. BLUM, OF CHICAGO, ILLINOIS, ASSIGNOR TO ARMSTRONG-BLUM MANUFACTURING COMPANY, OF CHICAGO, ILLINOIS, A CORPORATION OF ILLINOIS.

METHOD OF MAKING CUTTING BLADES.

Application filed December 8, 1921. Serial No. 520,838.

*To all whom it may concern:*

Be it known that I, GEORGE J. BLUM, a citizen of the United States, residing at Chicago, in the county of Cook and State of Illinois, have invented a certain new and useful Method of Making Cutting Blades, of which the following is a specification.

The invention relates to the manufacture of cutting blades such, for example, as hacksaw blades; and it has for it general aim the making of a blade of this type which is of high efficiency from an operative standpoint, and at the same time is capable of being manufactured at a relatively low cost.

It is common practice to construct metal-cutting tools from tungsten steel, commonly known as high speed steel, it being generally recognized by those skilled in this art that tools so constructed are greatly superior to tools made of carbon steel. Various attempts have also been made to construct cutting blades, such as hacksaw blades, from solid strips of high speed steel. Owing, however, to the high cost of the material and the increased cost of manufacture, it has been found unprofitable, and hence impracticable, to manufacture saw blades as thus constructed from a solid strip of high speed steel. Moreover, such blades are objectionable because of their tendency to break or snap in use.

The object of my invention is to produce a cutting blade possessing all of the advantages of blades constructed wholly of highly speed steel, including their durability and their rapid cutting qualities, but having an initial cost approximately one-sixth as high as the cost of a blade constructed from a solid strip of high speed steel and less than the cost of blades as commonly constructed from carbon steel.

My invention consists in the application under pressure of a narrow strip of high speed steel to a strip of ordinary steel having a low carbon content, while raising the temperature of the two metals at their abutting edges to the fusion point and thus causing them to unite to form an integral structure. The preferred method of manufacture, moreover, involves the rolling of the strip of high speed steel directly upon one edge of the strip of ordinary steel, in a continuous operation, and while the temperature of the abutting edges of the two strips is raised to the fusion point by passing electric currents therethrough. The method thus involves a roll-welding operation, whereby the joinder of the metals is effected in a progressive manner from one end of the blade to the other. It, therefore, differs radically from the method commonly termed "butt-welding", which is capable of successful usage only when the abutting edges to be united are of relatively short length.

In the accompanying drawings Figure 1 is a side elevation of the parts from which a hacksaw blade is constructed in accordance with my invention, the parts being shown in detached relation. Fig. 2 is a similar view of the parts after they have been welded together. Fig. 3 is a view of the blade prior to the formation of the teeth therein, with a strip of tool steel applied to the body or back of the blade so as to form in effect an integral structure. Fig. 4 is a side elevation of the completed blade. Figs. 5 and 6 are fragmentary plan and side views, partially diagrammatic in character, illustrating the method employed in the application of the narrow strip of tool steel to the back or body of the blade.

Referring to Figs. 1, 2 and 5, 7 designates a strip of relatively soft steel from which the body or back of the blade is to be formed, and 8 indicates a narrow strip of high speed tool steel of a length substantially equal to that of the strip 7. The dimensions of the strip 8 are such as to render it flexible edgewise.

The strip 8, when applied to the strip 7, constitutes a cutting edge portion, the strip 7 forming the back or body portion. Preferably the strip 8, while relatively narrow, is of sufficient width to enable it to be properly ground and reground if desired, to produce the desired cutting edge. As herein shown, this cutting edge is in the form of saw teeth 9 formed in any suitable and well known way.

Referring now to Figs. 5 and 6, the preferred method employed in carrying out my invention consists in the passage of the two strips edge to edge between a plurality of rolls, certain of which constitute electrodes arranged so that an electric current passing through the abutting edges of the two strips raises the temperature thereof to the fusion point while other rolls press the abutting edges together firmly. In this operation, the strip 8 is forced bodily into the edge of the strip or base 7. This occurs as a result of the pressure exerted upon the strips and the condition of the metals when heated. Thus, referring to Fig. 6, it will be apparent that as the strip 8 is forced into engagement with the strip 7, the edge of the latter gives way slightly, and consequently the strip 8 bends outwardly away from the strip 7 above the point of its engagement therewith. Obviously, as the metals become relatively soft or semi-plastic, they are merged by the continuous rolling operation into an integral structure. This method of applying the cutting edge portion by rolling is also advantageous because it is not limited to use in connection with straight edges but is capable of use even where the edge to be produced is circular in form.

Relative movement between the strips 7 and 8 and the rolls through which they pass may be effected in any suitable way. Herein the electrodes are in the form of driven disks 10 and 10$^a$ and 11 and 11$^a$. The disks 10 and 11, are disposed upon opposite sides of the strip 7 near the edge thereof and are of negative polarity, and the disks 10$^a$ and 11$^a$ are disposed upon opposite sides of the strip 8, and are of positive polarity.

It will thus be observed that the electrodes of each pair are of equal potential, and the result is that when the strips are passed between the disks, currents of electricity are caused to flow through the abutting edges of the strips and from one side thereof to the other. The electrodes are held, in any suitable way, in position to engage firmly the strips 7 and 8, passing therethrough, and each is driven by means, not shown, so that the desired movement is imparted to the strips.

12 and 13 designate respectively rollers engaging the outer edges of the strips 7 and 8, the roller 13 exerting under the action of a spring 14 the desired pressure upon the strip 8. A guide block or plate 15 is preferably stationarily mounted with respect to the roll 12. This block has a notch therein adapted to receive the outer edge of the strip 7, and thus assists in maintaining the strip in its proper position while passing between the electrodes.

By reason of the rolling pressure exerted upon the strip 8 in its heated or semi-plastic condition, it becomes somewhat reduced in width and elongated as shown in Fig. 2.

After the strip 8 is thus initially applied to the strip 7, the united parts are placed in an annealing furnace and treated to facilitate the work of finishing the blade, the same being shown in its completed form, except for the provision of the teeth 9, in Fig. 3. After the teeth have been formed therein and set, the blade is tempered and drawn.

It will be seen that I have produced a method of making a cutting blade having all of the advantages of a blade constructed entirely of high speed steel, and yet which is capable of being manufactured at a cost which is not excessive from a practical standpoint. The cutting edge being of high speed steel renders it possible to operate the blade at a much higher rate of speed than is possible with the ordinary blade, and the body or back of the blade may be made of steel even less expensive than that necessarily employed in the former blade. Also, the fact that the cutting edge portion is very narrow, makes it possible to reduce waste in forming the same to a minimum. Moreover, a blade made in accordance with my invention is superior to solid tool steel blades because its back, being made from relatively softer steel lends toughness and strength to the blade, thus eliminating largely the tendency of the same to snap when subjected to extreme strains; and by reason of exceptional durability of the blade, a substantial saving in labor spent in replacing worn-out blades is effected.

Claims to the article of manufacture produced in accordance with the process herein disclosed are contained in my copending application Serial No. 660,826 filing date September 4, 1923.

I claim as my invention:

1. The method of making a cutting blade which consists in passing two steel strips of the desired characteristics between two opposed bearing surfaces with their edges abutting, raising the temperature of the abutting edges as they pass between said surfaces to the fusion point, and forcing the strips together as the edges thereof become semi-plastic.

2. The method of making cutting blades which consist in arranging a relatively wide strip of steel and a narrow strip of steel edge to edge between two opposed rollers providing bearing surfaces for the opposite edges of said strips, raising the temperature of the abutting edges at a point between said rollers sufficiently to render the metals semi-plastic, and effecting relative movement between said strips and said rollers at a uniform speed throughout the length of the strips.

3. The method of making cutting blades which consists in arranging a relatively wide strip of steel and a narrow strip of steel edge to edge between two opposed rollers providing bearing surfaces for the opposed edges of said strips, raising the temperature of the abutting edges at a point between said rollers sufficiently to render the metals somewhat plastic, effecting relative movement between said strips and said rollers at a uniform speed throughout the length of the strips, and exerting pressure upon the roll engaging the narrower strip whereby to force the latter bodily into the adjoining edge of the wider strip.

4. The method of making cutting blades which consists in pressing a relatively narrow strip of steel progressively upon one edge of a body or base of relatively softer steel while raising the temperature of the two metals at their abutting edges to the fusion point.

5. The method of making a new article of manufacture which consists in rolling a relatively thin strip of steel of high wear-resisting quality directly upon a body or base of relatively softer steel while raising the temperature of the abutting edges only to the point of fusion.

6. The method of making a cutting blade which consists in pressing two strips of steel together edge to edge and raising the temperature thereof at their abutting edges only, simultaneously but in a continuous operation beginning at one end and progressing at a uniform rate of speed to the other end.

7. The method of making a cutting blade which consists in pressing two strips of steel together edge to edge and raising the temperature thereof at their abutting edges only, simultaneously but in a continuous operation beginning at one end and progressing to the other end.

8. The method of welding two metallic parts together in edge to edge relation which consists in forcing the parts into intimate contact progressively throughout the length of their abutting edges, and simultaneously heating the adjoining edge portions of both parts to a state of semi-plasticity by passing currents of electricity from opposite sides of one part through the abutting edges of the two parts and then out from the opposite sides of the other part.

In testimony whereof, I have hereunto set my hand.

GEORGE J. BLUM.